United States Patent
Ranjan et al.

(10) Patent No.: US 10,392,968 B2
(45) Date of Patent: Aug. 27, 2019

(54) TURBINE CASING COOLING STRUCTURE

(71) Applicant: UNITED TECHNOLOGIES CORPORATION, Farmington, CT (US)

(72) Inventors: Ram Ranjan, West Hartford, CT (US); James D. Hill, W. Abington Township, PA (US); Glenn Levasseur, Colchester, CT (US); Joel H. Wagner, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 215 days.

(21) Appl. No.: 15/495,283

(22) Filed: Apr. 24, 2017

(65) Prior Publication Data
US 2018/0306059 A1   Oct. 25, 2018

(51) Int. Cl.
| F01D 25/14 | (2006.01) |
| F01D 5/06 | (2006.01) |
| F01D 25/12 | (2006.01) |
| F01D 25/24 | (2006.01) |
| F28D 15/02 | (2006.01) |
| F28D 21/00 | (2006.01) |

(52) U.S. Cl.
CPC .............. *F01D 25/14* (2013.01); *F01D 5/06* (2013.01); *F01D 25/12* (2013.01); *F01D 25/24* (2013.01); *F28D 15/0266* (2013.01); *F28D 15/0275* (2013.01); *F05D 2220/32* (2013.01); *F05D 2260/208* (2013.01); *F28D 2021/0026* (2013.01)

(58) Field of Classification Search
CPC .......... F01D 25/14; F01D 25/24; F01D 25/12; F01D 5/06; F01D 25/26; F28D 15/0266; F28D 15/0275; F28D 2021/0026; F05D 2260/208; F05D 2220/32; F02C 7/141; F01B 31/08
See application file for complete search history.

(56) References Cited

U.S. PATENT DOCUMENTS

| 5,167,123 | A | * | 12/1992 | Brandon | ................ F01D 25/14 165/47 |
| 5,178,514 | A | * | 1/1993 | Damiral | ................ F01D 11/08 415/114 |
| 7,823,374 | B2 | * | 11/2010 | Venkataramani | ....... F02C 7/047 60/226.1 |
| 8,015,788 | B2 | | 9/2011 | Stephenson et al. | |
| 2007/0017208 | A1 | | 1/2007 | Ralls | |
| 2016/0290214 | A1 | | 10/2016 | Ekanayake et al. | |
| 2016/0290233 | A1 | | 10/2016 | Ekanayake et al. | |
| 2016/0290235 | A1 | | 10/2016 | Ekanayake et al. | |

\* cited by examiner

*Primary Examiner* — Eldon T Brockman
(74) *Attorney, Agent, or Firm* — Snell & Wilmer, L.L.P.

(57) ABSTRACT

A turbine casing may comprise a casing body a heat pipe disposed in the casing body. The heat pipe may include a vaporization section and a condensation section. The vaporization section may be located forward the condensation section. The vaporization section may be located in a high pressure turbine region of the casing body. The condensation section may be located in a low pressure turbine region of the casing body.

20 Claims, 7 Drawing Sheets

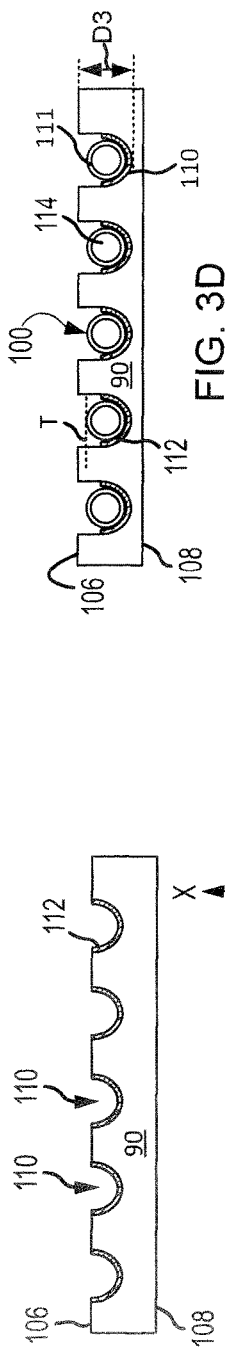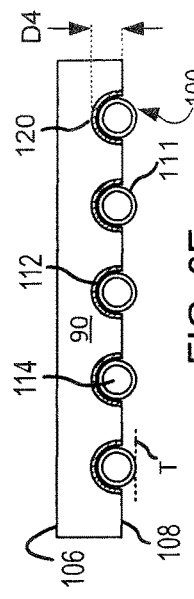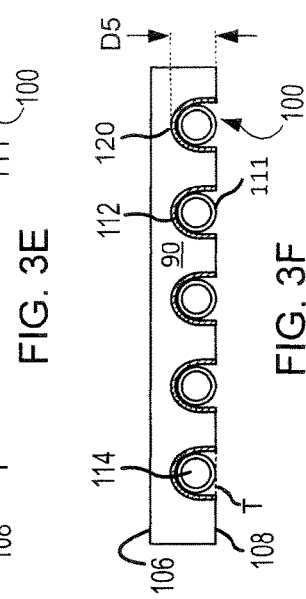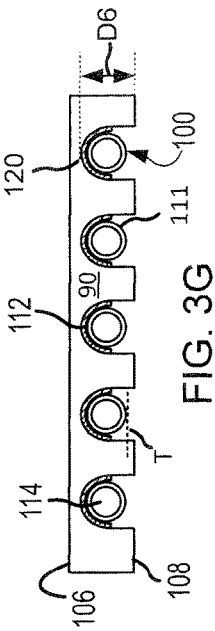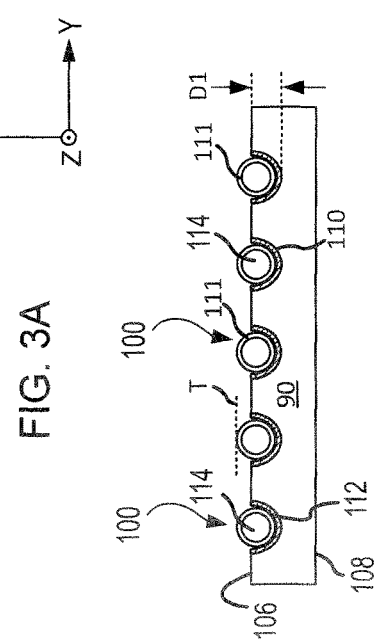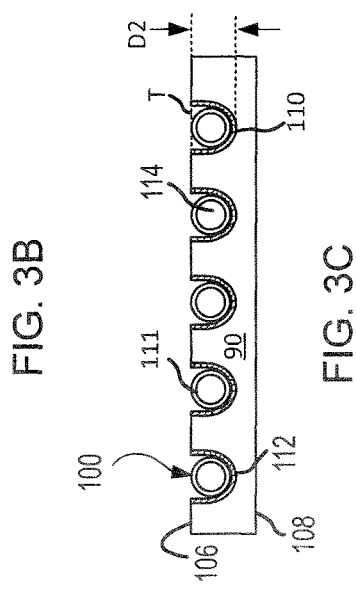

TURBINE CASING COOLING STRUCTURE

FIELD

The present disclosure relates to cooling structures for gas turbine engines, and, more specifically, to cooling structures for turbine casings.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The turbine section typically includes low pressure and high pressure turbines and a turbine casing surrounding the low pressure and high pressure turbines.

The turbine casing may encounter high thermal gradients in an axial direction across the high pressure turbine and low pressure turbine regions. The high temperature gradients may cause large deformations in the structure of the turbine casing which may lead to increased thermo-mechanical stresses in the turbine casing structure.

SUMMARY

A turbine casing is provided according to various embodiments. A turbine casing may comprise a casing body and a heat pipe disposed in the casing body. The heat pipe may include a vaporization section and a condensation section. The vaporization section may be located forward the condensation section.

In various embodiments, the vaporization section may be located in a high pressure turbine region of the casing body and the condensation section may be located in a low pressure turbine region of the casing body. A thermally conductive material may be disposed between the heat pipe and a surface of the casing body. The heat pipe may be disposed in a groove formed in an outer surface of the casing body. The heat pipe may extend radially outward beyond the outer surface of the casing body. In various embodiments, the heat pipe may be at least one of coplanar with the outer surface of the casing body or recessed with respect to the outer surface of the casing body.

In various embodiments, the heat pipe may be disposed within a groove formed in an inner surface of the casing body. The heat pipe may be at least one of coplanar with the inner surface of the casing body or recessed with respect to the inner surface of the casing body. In various embodiments, the heat pipe may comprise a working medium and an internal surface of the casing body may be in contact with the working medium.

In various embodiments, a gas turbine engine may comprise a high pressure turbine and a low pressure turbine aft of the high pressure turbine. A turbine casing may be disposed around the high pressure turbine and the low pressure turbine. A heat pipe may be disposed in the turbine casing and may comprise a vaporization section and a condensation section. The vaporization section may be radially outward from the high pressure turbine.

In various embodiments, the heat pipe may include a working medium comprising at least one of water, ethanol, mercury, sulfur, cesium, sodium, potassium, calcium, or indium. An internal surface of the turbine casing may be in contact with the working medium. In various embodiments, the heat pipe may be surrounded by the turbine casing. The heat pipe may be disposed within at least one of a first groove formed in an outer surface of the turbine casing or a second groove formed in an inner surface of the turbine casing. A thermally conductive material may be disposed between the heat pipe and the turbine casing. The heat pipe may be at least one of coplanar with an outer surface of the turbine casing or recessed with respect to the outer surface of the turbine casing. In various embodiments, the condensation section of the heat pipe may be radially outward from the low pressure turbine.

In various embodiments, a method of cooling a turbine casing is disclosed. A method of cooling a turbine casing is disclosed may comprise disposing a vaporization section of a heat pipe in a high pressure turbine region of the turbine casing, and disposing a condensation section of the heat pipe aft of the vaporization section.

In various embodiments, the method may further comprise forming a groove in at least one of an inner surface of the turbine casing or an outer surface of the turbine casing, and disposing the heat pipe in the groove. In various embodiments, the method may further comprise disposing the condensation section of the heat pipe in a low pressure turbine region of the turbine casing.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIGS. 3A, 3B, 3C, 3D, 3E, 3F, 3G, 3H, 3I, 3J illustrate a cross-sectional view of a portion of a turbine casing including a cooling system comprising heat pipes, in accordance with various embodiments;

DETAILED DESCRIPTION

Figure 1:
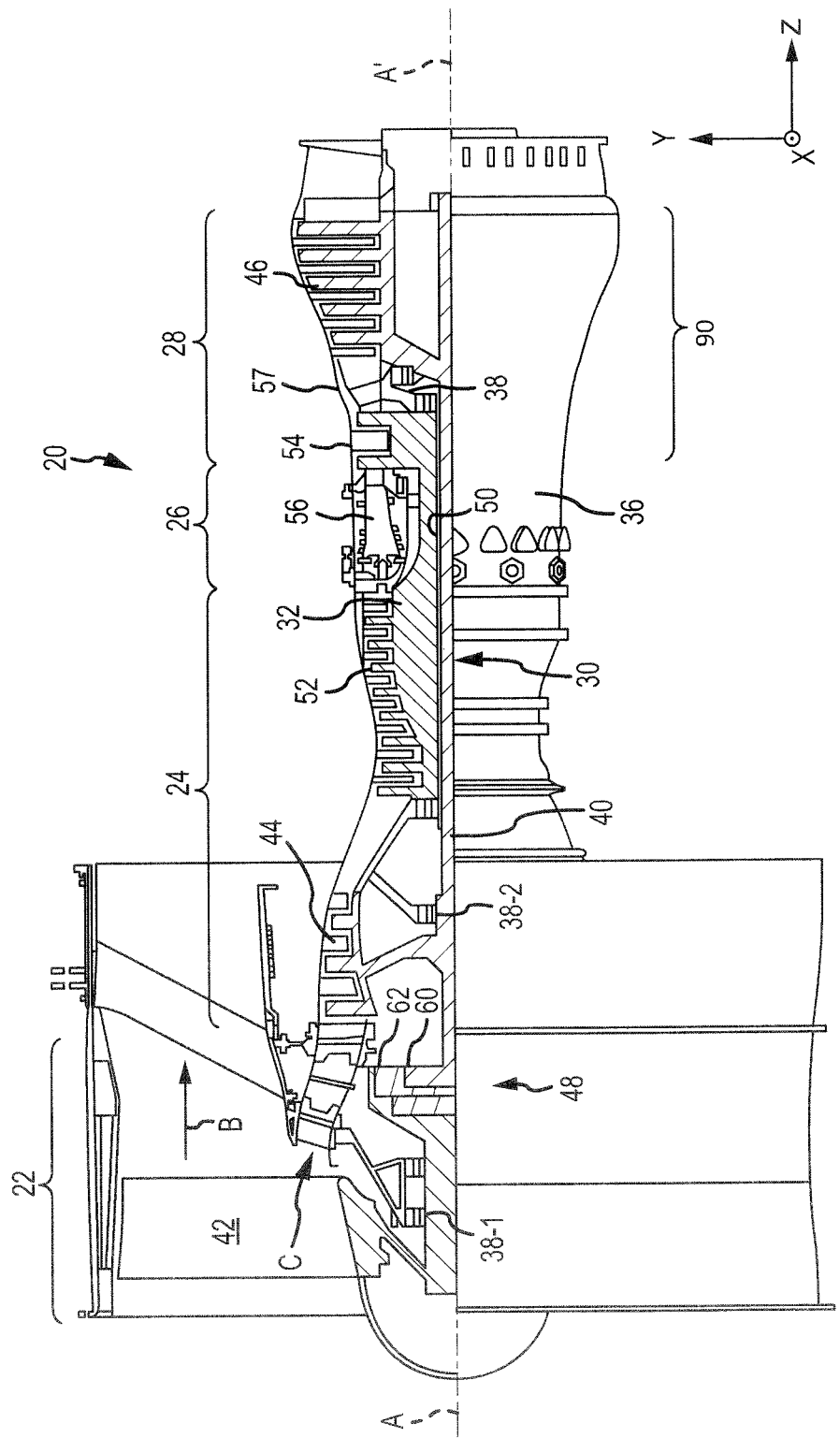
FIG. 1 illustrates a cross-sectional view of an exemplary gas turbine engine, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. As used herein, "distal" refers to the direction outward, or generally, away from a reference component. As used herein, "proximal" and/or "proximate" refer to a direction inward, or generally, towards the reference component.

A turbine casing having a high pressure region at or near a high pressure turbine and a low pressure region at or near a low pressure turbine may include a cooling system, for example, a heat pipe. The cooling system may remove heat from the turbine casing to equalize and/or reduce the temperature throughout the turbine casing. Various cooling features may be formed at the high pressure and low pressure regions of the turbine casing, depending on the design and function of the turbine casing. The present disclosure describes a turbine casing including a cooling system comprising a heat pipe disposed, at least partially, within the body of the turbine casing. The heat pipe may include an evaporator section disposed radially outward from the high pressure turbine, a condenser section disposed radially outward from the low pressure turbine, and a heat fluid conduit section connecting the evaporator and condenser sections.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a path of bypass airflow B while compressor section 24 can drive coolant along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 (also referred to as an engine casing structure) via several bearing systems 38, 38-1, and 38-2. Engine central longitudinal axis A-A' is oriented in the z direction on the provided xyz axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine casing structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Engine casing structure 36 may include a turbine casing 90 (also referred to as turbine casing body) extending from a forward edge of high pressure turbine 54 to an aft edge of low pressure turbine 46. Turbine casing 90 may have a generally annular shape and may surround high pressure turbine 54 and low pressure turbine 46. Turbine casing 90 may comprise a ceramic, a ceramic matrix composite, a metal (e.g., aluminum, copper, titanium, etc.), an alloy (e.g., steel, stainless steel, aluminum alloy, titanium alloy, etc.), or other thermally conductive material, and combinations of thereof.

Figure 2:
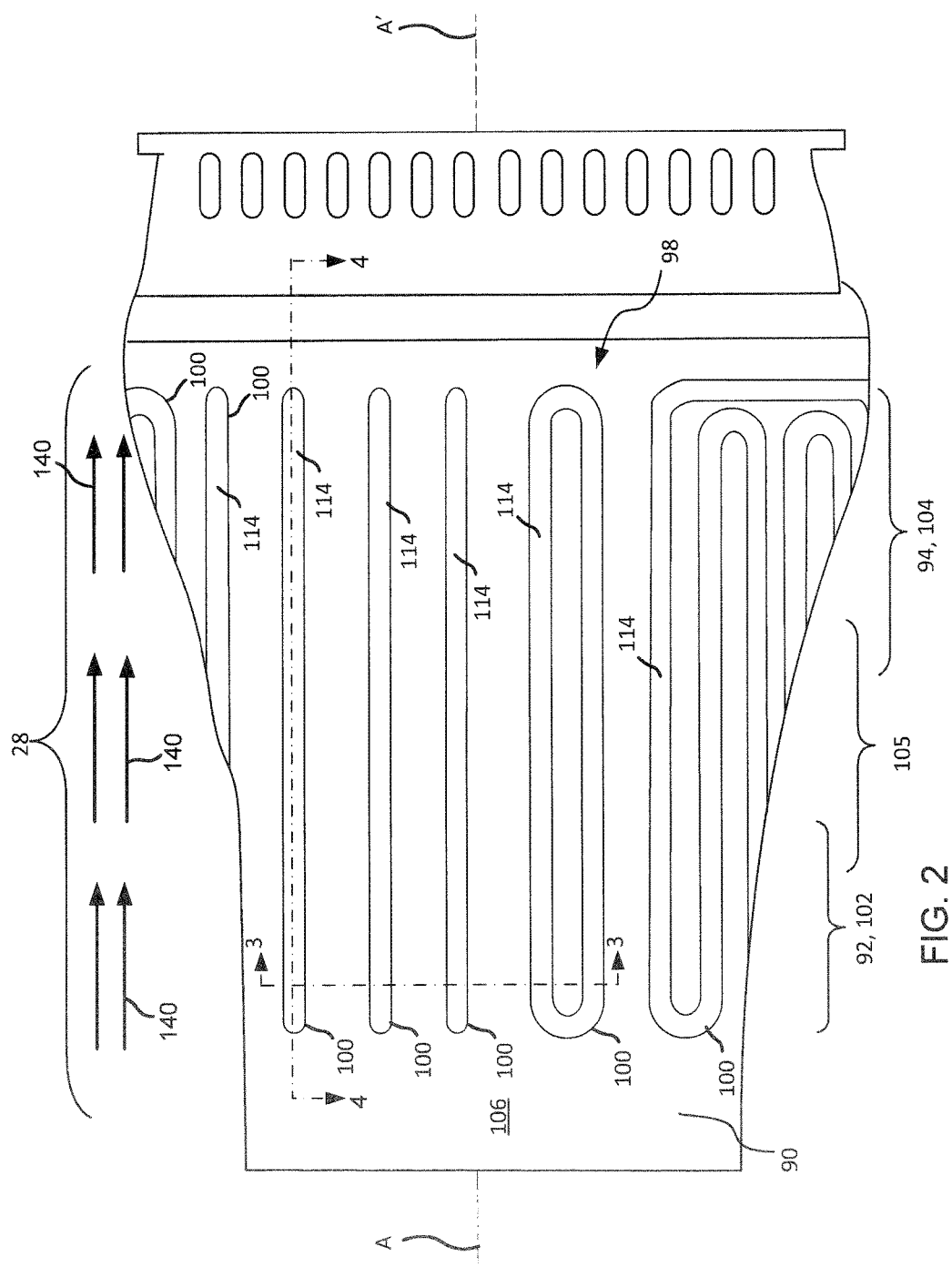
FIG. 2 illustrates a turbine casing including a cooling system comprising heat pipes, according to various embodiments.

With reference to FIG. 2, a portion of gas turbine engine 20 comprising turbine casing 90 is illustrated, in accordance with various embodiments. Turbine casing 90 may comprise a high pressure turbine region 92 and a low pressure turbine region 94. High pressure turbine region 92 may correspond to the portion of turbine casing 90 that is radially outward from high pressure turbine 54. Low pressure turbine region 94 may correspond to the portion of turbine casing 90 that is radially outward from low pressure turbine 46. Turbine casing 90 may further comprise a cooling system 98 configured to remove heat from turbine casing 90, particularly from high pressure turbine region 92. Cooling system 98 may include a plurality of heat pipes 100 extending between high pressure turbine region 92 and low pressure turbine region 94.

In various embodiments, heat pipes 100 may each comprise a vaporization section 102 and a condensation section 104. Vaporization section 102 may be located in, and correspond to, high pressure turbine region 92 of turbine casing 90. In other words, vaporization section 102 may be radially outward from high pressure turbine 54. Condensation section 104 may be located in and correspond to low pressure turbine region 94 of turbine casing 90. In other words, condensation section 104 may be radially outward from low pressure turbine 46. Heat pipes 100 may comprise a heat fluid conduit section 105 connecting vaporization section 102 and condensation section 104.

Heat pipes 100 of cooling system 98 may include oscillating heat pipes, loop heat pipes, capillary heat pipes, and combinations thereof. Heat pipes 100 may be disposed in a serpentine layout, an annular or loop layout, a linear layout, or in any other suitable pattern or layout, and combinations thereof.

Heat pipes 100 use an evaporative cooling cycle to transfer thermal energy through the vaporization and condensation of a working medium 114 within heat pipes 100. Vaporization section 102 of heat pipes 100 may be disposed within high pressure turbine region 92 of turbine casing 90. Turbine casing 90 is in thermal communication with heat pipes 100 and with the working medium 114 within heat pipes 100. Working medium 114 in the vaporization section 102 of heat pipes 100 absorbs thermal energy present in vaporization section 102 and transfers that absorbed thermal energy to condensation section 104. Working medium 114 is distributed to the vaporization section 102 in a liquid state. Thermal energy absorbed by turbine casing 90 from high pressure turbine 54 heats vaporization section 102 of heat pipes 100. Thermal energy may be conducted from turbine casing 90, particularly high pressure turbine region 92, to working medium 114 within heat pipes 100. The transfer of thermal energy from the turbine casing 90 to working medium 114 increases the temperature of the working medium 114 in vaporization section 102. The heating of vaporization section 102 may cause the working medium 114 in vaporization section 102 to evaporate within heat pipes 100. Working medium 114 absorbs thermal energy and is converted to a gaseous state when its boiling point is reached. The working medium 114 in the gaseous state may then pass to condensation section 104 via heat fluid conduit section 105.

Condensation section 104 may be disposed in an area away from high pressure turbine region 92, for example, in low pressure turbine region 94. Stated another way, condensation section 104 may be disposed in an area of turbine casing 90 that tends to be cooler than high pressure turbine region 92. Condensation section 104 may be disposed radially outward of low pressure turbine 46. Condensation section 104 may be in fluid communication with an airflow source, such as an upstream compressor in the compressor section 24 (FIG. 1) or other source, which provides a cooling airflow 140 around low pressure turbine region 94, such as bleed compressor air.

The cooling airflow 140 flows around condensation section 104 absorbs thermal energy from condensation section 104, removing thermal energy from working medium 114, and causing the vaporized working medium 114 to condense back to a liquid state. The working medium 114 in the liquid state may then be transported back to vaporization section 102 via heat fluid conduit section 105. Working medium 114 physically moves between vaporization section 102 and condensation section 104, in order to transfer thermal energy between the locations where vaporization and condensation occur, thereby removing heat from turbine casing 90 and reducing a thermal gradient across turbine casing 90.

In various embodiments, working medium 114 may comprise water, ethanol, mercury, sulfur, cesium, sodium, potassium, calcium, indium, combinations of the same and/or other material having a boiling point above 300 K at 1 atmosphere (atm) (1.01 bar). The composition of the working medium 114 used in heat pipes 100 may be selected according to the particular operating conditions at which heat transfer is desired. For example, a working medium with a boiling point above 900 K at 1 atm (1.01 bar), (e.g., calcium, indium, cesium, etc.) may be selected for high temperature operating conditions (e.g., above 700 K) and a working medium with a boiling point between 300 K and 750 K at 1 atm (1.01 bar) (e.g., water, sulfur, ethanol, mercury, etc.) may be selected for lower temperature operating conditions (e.g., below 700 K). Cooling system 98 may include a combination of heat pipes 100 having working medium 114 with varying boiling points arranged in series between high pressure turbine region 92 and low pressure turbine region 94. For example, cooling system 98 may include a first heat pipe, having a working medium 114 comprising indium disposed proximate to high pressure turbine 54, followed by a second heat pipe aft of the first heat pipe and having a working medium 114 comprising potassium, followed by a third heat pipe aft of the second heat pipe and having a working medium comprising water. In various embodiments, the condensation section of one heat pipe in a series of heat pipes may be located adjacent (e.g., circumferentially adjacent or axially adjacent) to the vaporization section of the next heat pipe in the series. In various embodiments, adjacent condensation and vaporization sections may be integrally fabricated to reduce thermal resistance between the sections. In various embodiments, adjacent condensation and vaporization sections may be configured to transfer heat via a thermal interface material.

Figure 4:
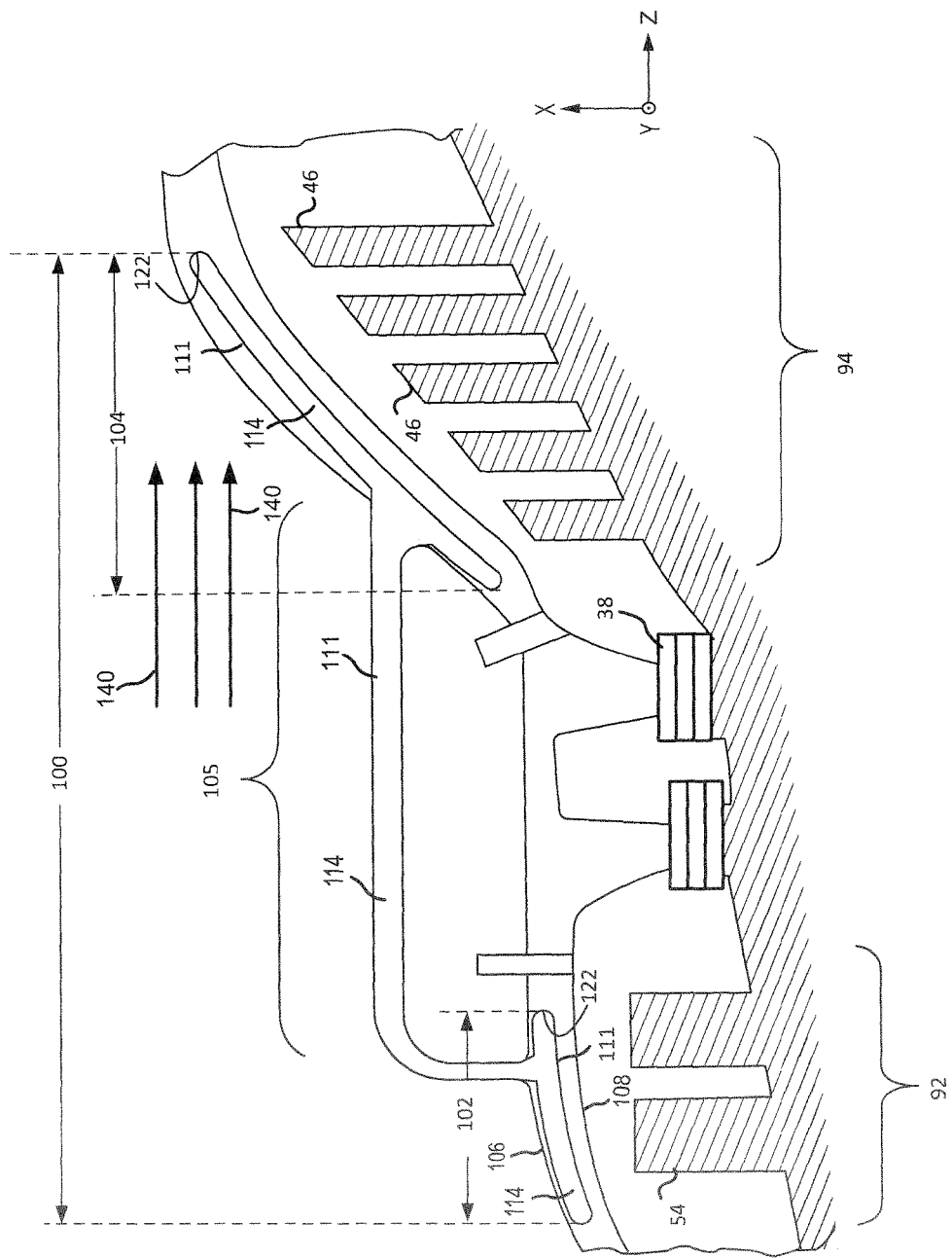
FIG. 4 illustrates a cross-sectional view of a portion of a turbine casing including a cooling system comprising heat pipes, in accordance with various embodiments.

FIG. 4 illustrates a cross-sectional view of a portion of turbine casing 90 taken along line 4-4 of FIG. 2, in accordance with various embodiments. With reference to FIG. 4, elements with like element numbering as depicted in FIG. 1 and FIG. 2, are intended to be the same and will not necessarily be repeated for the sake of clarity. Heat pipes 100 may be at least partially disposed within or integrally formed within turbine casing 90. In various embodiments, vaporization section 102, condensation section 104, and/or heat fluid conduit section 105 of heat pipes 100 may be formed as a chamber within turbine casing 90 such that an internal surface 122 of turbine casing 90 defines vaporization section 102, condensation section 104, and/or heat fluid conduit section 105, and the working medium 114, within heat pipe 100, physically contacts internal surface 122 of turbine casing 90.

In various embodiments, vaporization section 102, condensation section 104, and/or heat fluid conduit section 105 may be defined by a heat pipe tube 111 disposed within turbine casing 90. For example, heat pipe tube 111 may comprise a sealed tube containing working medium 114 and an outer surface of heat pipe tube 111 contacts (physically and/or thermally) internal surface 122 of turbine casing 90. In various embodiments, heat pipe tube 111 may be disposed within a pre-formed groove or opening in turbine casing 90. Heat pipe tube 111 may comprise a metal, metal alloy, or other thermally conductive material. In various embodiments, heat pipe tube 111 may comprise aluminum, copper, silica, nickel, titanium, stainless steel, iron, tungsten, or tantalum.

The material of heat pipe tube 111 may be selected to compliment the working medium 114 contained in heat pipe tube 111. For example, stainless steel, nickel, titanium, or tungsten may be used to form a heat pipe tube 111 that contains a high temperature working medium 114 (i.e., a working medium suitable for operating at temperatures greater than 700 K). Stainless steel, copper, silica, nickel, or aluminum may be used to form a heat pipe tube 111 that contains a lower temperature working medium (i.e., a working medium 114 suitable for operating at temperatures below 700 K).

In various embodiments, vaporization section 102, condensation section 104, and heat fluid conduit section 105 of heat pipes 100 may each be in direct physical contact with a surface of turbine casing 90 or in contact with a surface of turbine casing 90 through a thermally conductive material, for example, through a thermally conductive adhesive. In various embodiments, vaporization section 102 and condensation section 104 may be in direct physical contact with a surface of turbine casing 90 (or in contact with a surface of turbine casing 90 through a thermally conductive material) and heat fluid conduit section 105 may extend between vaporization section 102 and condensation section 104 without being in physical contact with turbine casing 90. In other words, in various embodiments, an outer circumference of heat pipe tube 111 in heat fluid conduit section 105 may be exposed from turbine casing 90. Turbine casing 90 may be fabricated using superplastic forming, advanced additive machining techniques, or other suitable manufacturing processes.

FIGS. 3A-3J illustrate a cross-sectional view of a portion of turbine casing 90 along line 3-3 of FIG. 2, in accordance with various embodiments. With reference to FIGS. 3A-3J, elements with like element numbering as depicted in FIG. 2, are intended to be the same and will not necessarily be repeated for the sake of clarity.

FIG. 3A, shows turbine casing 90 with heat pipes 100 removed for clarity. Turbine casing 90 includes an outer surface 106 and an inner surface 108 opposite outer surface 106. Outer surface 106 of turbine casing 90 is oriented radially outward; in other words, away from high pressure turbine 54 and low pressure turbine 46 (FIG. 1). Inner surface 108 of turbine casing 90 is oriented radially inward such that inner surface 108 faces, or is oriented towards, high pressure turbine 54 and low pressure turbine 46 (FIG. 1).

In various embodiments, a plurality of grooves 110 may be formed in outer surface 106 of turbine casing 90. Grooves 110 may extend partially through turbine casing 90 such that a portion of turbine casing 90 remains between the bottom surface of grooves 110 and inner surface 108 of turbine casing 90. Grooves 110 may be formed having a curved surface. The surface of grooves 110 may be formed to mirror the shape of heat pipes 100. A thermally conductive material 112 may be disposed in grooves 110. In various embodiments, thermally conductive material 112 may be a thermally conductive adhesive.

FIG. 3B illustrates heat pipes 100 disposed in grooves 110, in accordance with various embodiments. With reference to FIG. 3B, elements with like element numbering as depicted in FIG. 3A, are intended to be the same and will not necessarily be repeated for the sake of clarity. As shown in FIG. 3B, thermally conductive material 112 may be disposed between heat pipes 100 and turbine casing 90. Thermally conductive material 112 may couple and/or secure heat pipes 100 to turbine casing 90. Thermally conductive material 112 may aid in the transfer of heat between turbine casing 90 and heat pipes 100. Thermally conductive material 112 may comprise a thermal epoxy, thermal epoxy resin, thermally conductive paste, thermal grease, or thermal tape. Thermally conductive material 112 may also be disposed on the surface of heat pipe tube 111 prior to mounting heat pipe tube 111 to turbine casing 90.

A depth D1 of grooves 110 may be selected so that heat pipes 100 extend beyond (i.e., radially outward from) outer surface 106 of turbine casing 90. Said another way, grooves 110 may be configured such that a line T, which is tangent to heat pipes 100 and parallel to outer surface 106, is radially outward from outer surface 106.

With reference to FIG. 3C, elements with like element numbering as depicted in FIG. 3A, are intended to be the same and will not necessarily be repeated for the sake of clarity. FIG. 3C illustrates heat pipes 100 as coplanar with outer surface 106, in accordance with various embodiments. A depth D2 of grooves 110 may be selected such that line T, which is tangent to heat pipes 100 and parallel to outer surface 106 of turbine casing 90, is coplanar with outer surface 106.

With reference to FIG. 3D, elements with like element numbering as depicted in FIG. 3A, are intended to be the same and will not necessarily be repeated for the sake of clarity. FIG. 3D illustrates heat pipes 100 as recessed with respect outer surface 106, in accordance with various embodiments. A depth D3 of grooves 110 may be selected such that line T, which is tangent to heat pipes 100 and parallel to outer surface 106 of turbine casing 90, is recessed with respect to outer surface 106 (i.e., line T is radially inward from outer surface 106).

With reference to FIG. 3E, heat pipes 100 may be configured to extend beyond (i.e., radially inward from) inner surface 108 of turbine casing 90, in accordance with various embodiments. With reference to FIG. 3E, elements with like element numbering as depicted in FIG. 3A, are intended to be the same and will not necessarily be repeated for the sake of clarity. As shown in FIG. 3E, a plurality of grooves 120 may be formed in inner surface 108 of turbine casing 90. Grooves 120 may extend partially through turbine casing 90 such that a portion of turbine casing 90 remains between the bottom surface of grooves 120 (i.e., radially outward surface of grooves 120) and outer surface 106 of turbine casing 90. Grooves 120 may be formed having a curved surface. The surface of grooves 120 may be formed to mirror the shape of heat pipes 100. Heat pipes 100 may be disposed in grooves 120. Thermally conductive material 112 may be disposed in grooves 120 and between heat pipes 100 and turbine casing 90. Heat pipes 100 may extend beyond (i.e., radially inward from) inner surface 108 of turbine casing 90. In other words, a depth D4 of grooves 120 may be selected such that line T, which is tangent to heat pipes 100 and parallel to inner surface 108 of turbine casing 90, is radially inward from inner surface 108.

FIG. 3F illustrates heat pipes 100 as coplanar with outer surface 106, in accordance with various embodiments. With reference to FIG. 3F, elements with like element numbering as depicted in FIG. 3E, are intended to be the same and will not necessarily be repeated for the sake of clarity. As shown in FIG. 3F, a depth D5 of grooves 120 may be selected such that line T, which is tangent to heat pipes 100 and parallel to inner surface 108 of turbine casing 90, is coplanar with inner surface 108.

FIG. 3G illustrates heat pipes 100 as recessed with respect inner surface 108, in accordance with various embodiments. With reference to FIG. 3G, elements with like element numbering as depicted in FIG. 3E, are intended to be the same and will not necessarily be repeated for the sake of clarity. As shown in FIG. 3G, a depth D6 of grooves 120 may be selected such that line T, which is tangent to heat pipes 100 and parallel to inner surface 108 of turbine casing 90, is recessed with respect to inner surface 108 (i.e., line T is radially outward from inner surface 108).

Figure 3H:
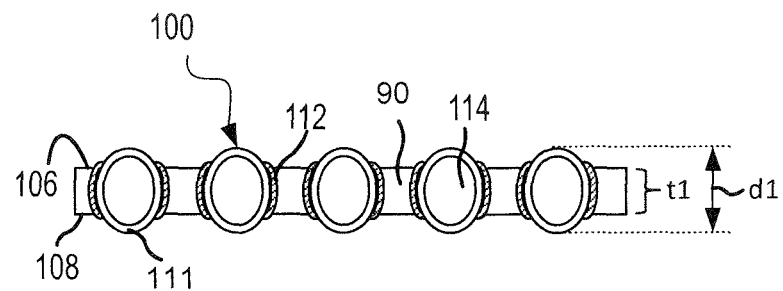

FIG. 3H illustrates heat pipes 100 as extending beyond both inner surface 108 and outer surface 106 of turbine casing 90, in accordance with various embodiments. With reference to FIG. 3H, elements with like element numbering as depicted in FIG. 3A, are intended to be the same and will not necessarily be repeated for the sake of clarity. As shown in FIG. 3H, heat pipes 100 may be partially surrounded by turbine casing 90 such that a thickness t1 of turbine casing 90, extending from outer surface 106 to inner surface 108, is less than a diameter d1 of heat pipes 100. Thermally conductive material 112 may be disposed between the surface of heat pipe tube 111 and turbine casing 90 to couple heat pipes 100 to turbine casing 90. Thermally conductive material 112 may aid in the transfer of heat between turbine casing 90 and heat pipes 100.

Figure 3I:
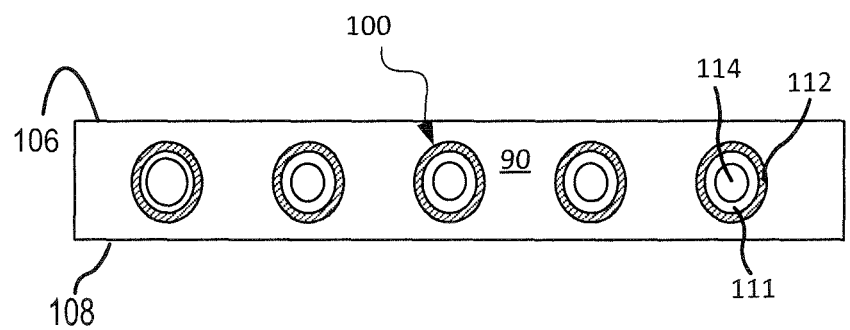

FIG. 3I illustrates heat pipes 100 as surrounded by turbine casing 90, in accordance with various embodiments. Stated another way, turbine casing 90 may extend around an entire circumference of each heat pipe 100. With reference to FIG. 3I, elements with like element numbering as depicted in FIG. 3A, are intended to be the same and will not necessarily be repeated for the sake of clarity. Thermally conductive material 112 may be disposed between the surface of heat pipe tube 111 and turbine casing 90 to couple heat pipes 100 to turbine casing 90. Thermally conductive material 112 may aid in the transfer of heat between turbine casing 90 and heat pipes 100.

Figure 3J:
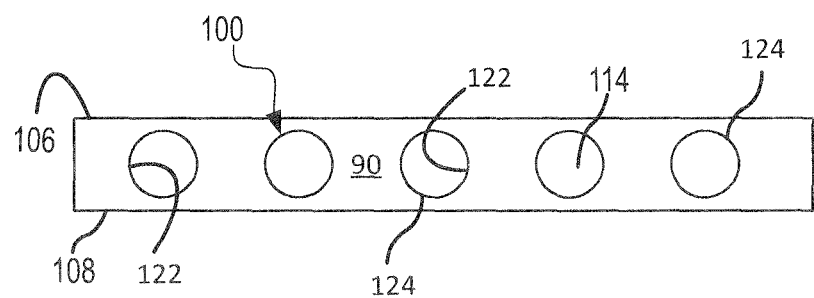

FIG. 3J illustrates heat pipes 100 as integrally formed within turbine casing 90, in accordance with various embodiments. An internal surface 122 of turbine casing 90 may form a chamber 124. Chamber 124 may form a sealed heat pipe tube within which working medium 114 may be disposed. Stated another way, turbine casing 90 may be in direct physical contact with working medium 114. Working medium 114 may transfer heat from high pressure turbine region 92 to condensation section 104/low pressure turbine region 94. In various embodiments, chamber 124, which is defined by internal surface 122 of turbine casing 90, may extend from vaporization section 102 to heat fluid conduit section 105. Chamber 124 may further extend to condensation section 104. Vaporization section 102, heat fluid conduit section 105, and/or condensation section 104 of heat pipes 100 may each be formed by a chamber 124. In other words, vaporization section 102, heat fluid conduit section 105, and/or condensation section 104 may each be defined by internal surface 122 of turbine casing 90.

In various embodiments, heat pipes 100 may comprise a combination of heat pipe tubes 111 and chambers 124. For example, in various embodiments, vaporization section 102 may comprise a chamber 124 with working medium 114 disposed therein, and heat fluid conduit section 105 and condensation section 104 may comprise heat pipe tubes 111 with working medium 114 disposed therein. In various embodiments, vaporization section 102 and condensation section 104 may comprise chambers 124 with working medium 114 disposed therein, and heat fluid conduit section 105 may comprise a heat pipe tube 111 working medium 114 disposed therein. In various embodiments, vaporization section 102 and condensation section 104 may comprise heat pipe tubes 111 with working medium 114 disposed therein, and heat fluid conduit section 105 may comprise a chamber 124 with working medium 114 disposed therein.

Turbine casing 90 including heat pipes 100 may exhibit an increased thermal performance and decreased thermomechanical stress. Heat may be conducted away from the turbine casing 90 by heat pipes 100, and more specifically, heat may be conducted away from high pressure turbine region 92 by the working medium 114 within heat pipes 100. Turbine casing 90 may experience a large axial gradient in temperature between the high pressure turbine region 92 and low pressure turbine region 94 of turbine casing 90. Heat pipes 100 may be able to reduce the axial temperature gradient across turbine casing 90 due to the high thermal conductivity (e.g., 1000 W/mK or greater) offered by heat pipes 100. For example, a heat source of turbine casing 90 (e.g., high pressure turbine region 92) may have a temperature of between 2000° F. and 3000° F. (i.e., between 1366 K and 1922 K), a heat sink of turbine casing 90 (e.g., low pressure turbine region 94) may have a temperature of between 100° F. and 200° F. (i.e., between 311 K and 366 K), and heat pipes 100 may comprise a thermal conductivity of between 1000 W/mK and 5000 W/mK; thus, heat pipe 100 having, for example, a diameter d1 of 1 inch (2.54 cm) and a length of 10 feet (304.8 cm) may be able to remove between about 200 W and 1100 W of heat from turbine casing 90. Additionally, if cooling system 98 employed, for example, ten (10) such heat pipes 100, a total heat (Q) removed may be between about 2 kW and 11 kW. As used herein, the term "about" means±5%. A smaller temperature gradient across turbine casing 90 may reduce structural deformation of turbine casing 90 and the associated thermomechanical stresses.

Figure 5:
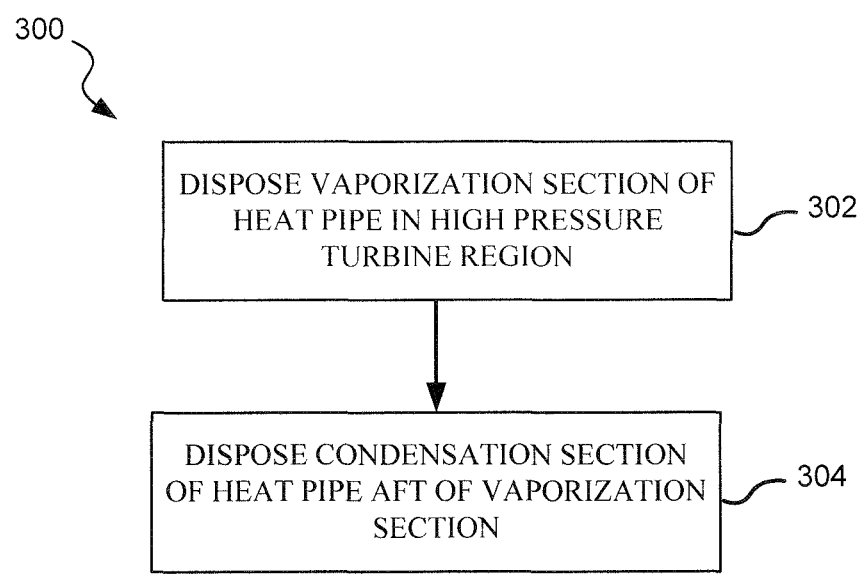
FIG. 5 illustrates a method of cooling a turbine casing, in accordance with various embodiments.

With reference to FIG. 5, a method 300 of cooling a turbine casing is shown, in accordance with various embodiments. Method 300 may include the steps of disposing a vaporization section of a heat pipe in a high pressure turbine region of the turbine casing (step 302) and disposing a condensation section of the heat pipe aft of the vaporization section (step 304).

In various embodiments, with combined reference to FIG. 2 and FIG. 5, step 302 may include disposing vaporization section 102 of heat pipe 100 in a high pressure turbine region 92 of turbine casing 90. Step 304 may include disposing condensation section 104 of the heat pipe 100 aft of the vaporization section 102.

Figure 6:
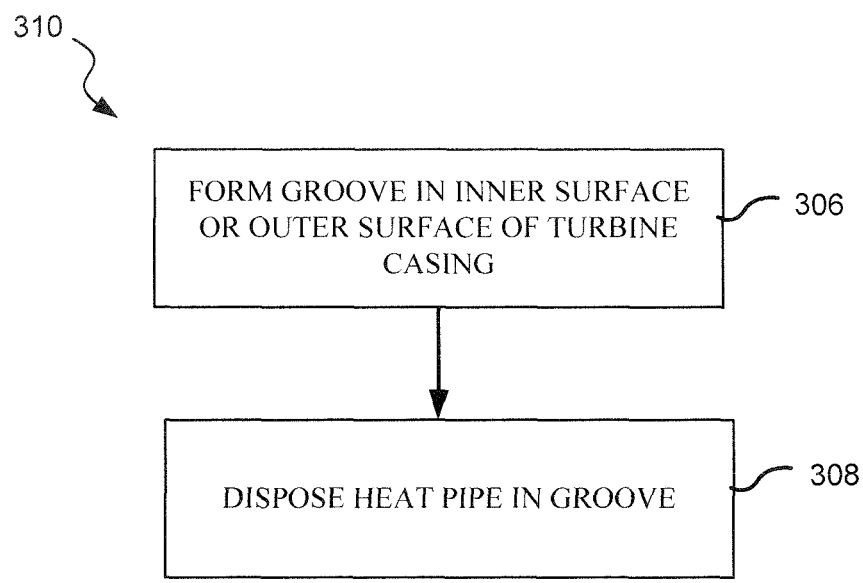
FIGS. 6 and 7 illustrate a method of cooling a turbine casing, in accordance with various embodiments.
Figure 7:
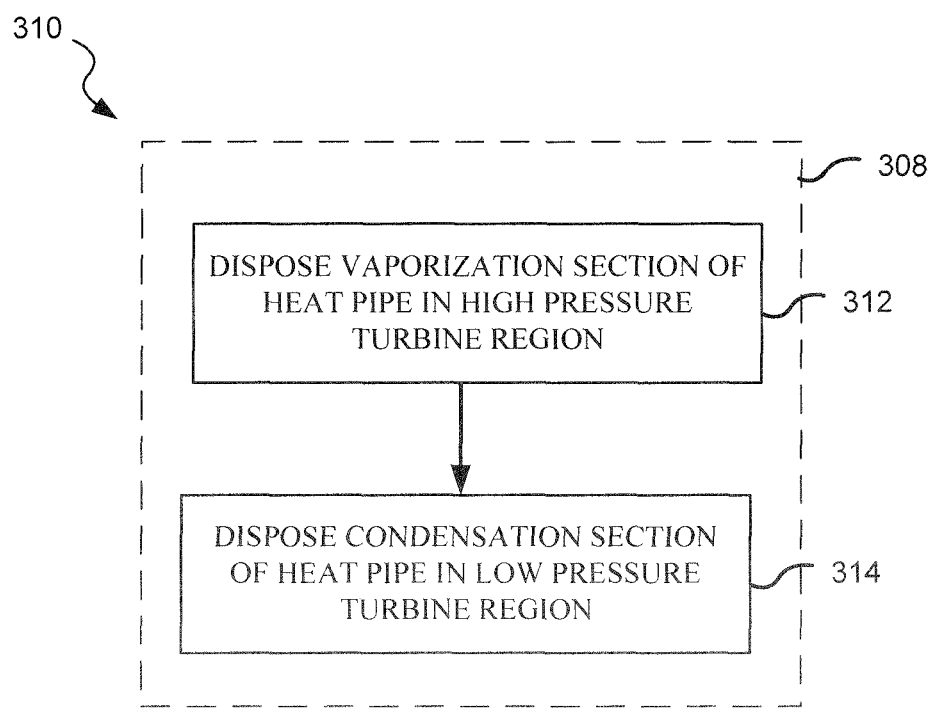

With reference to FIG. 6 and FIG. 7, a method 310 of cooling a turbine casing is shown, in accordance with various embodiments. Method 310 may include the steps of forming a groove in an inner surface or outer surface of the turbine casing (step 306), and disposing a heat pipe in the groove (step 308). In various embodiments, step 308 of method 310 may include disposing a vaporization section of the heat pipe in a high pressure turbine region of the turbine casing (step 312), and disposing a condensation section of the heat pipe in a low pressure turbine region of the turbine casing (step 314).

In various embodiments, with combined reference to FIG. 3A, FIG. 3B, FIG. 3E, and FIG. 6, step 306 may include forming groove 110 in inner surface 108 or outer surface 106 of turbine casing 90. Step 308 may include disposing heat pipe 100 in groove 110. In various embodiments, with combined reference to FIG. 2 and FIG. 7, step 312 may include disposing vaporization section 102 of heat pipe 100 in high pressure turbine region 92 of turbine casing 90. Step 314 may include disposing condensation section 104 of heat pipe 100 in low pressure turbine region 94 of turbine casing 90.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A turbine casing, comprising:
a casing body; and
a heat pipe disposed in the casing body, the heat pipe including a vaporization section and a condensation section, wherein the vaporization section is located forward the condensation section with respect to an engine central longitudinal axis, and wherein the vaporization section is located in a first turbine region of the casing body, and wherein the condensation section is located in a second turbine region of the casing body.

2. The turbine casing of claim 1, wherein the first turbine region comprises a high pressure turbine region of the casing body, the high pressure turbine region being configured to be located radially outward of a high pressure turbine section of a gas turbine engine, and wherein the second turbine region comprises a low pressure turbine region of the casing body, the low pressure turbine region being configured to be located radially outward of a low pressure turbine section of the gas turbine engine.

3. The turbine casing of claim 1, further including a thermally conductive material disposed between the heat pipe and a surface of the casing body.

4. The turbine casing of claim 1, wherein the heat pipe is disposed in a groove formed in an outer surface of the casing body.

5. The turbine casing of claim 4, wherein the heat pipe extends radially outward beyond the outer surface of the casing body.

6. The turbine casing of claim 4, wherein the heat pipe is at least one of coplanar with the outer surface of the casing body or recessed with respect to the outer surface of the casing body.

7. The turbine casing of claim 1, wherein the heat pipe is disposed within a groove formed in an inner surface of the casing body.

8. The turbine casing of claim 7, wherein the heat pipe is at least one of coplanar with the inner surface of the casing body or recessed with respect to the inner surface of the casing body.

9. The turbine casing of claim 1, wherein the heat pipe comprises a working medium and wherein an internal surface of the casing body is in contact with the working medium.

10. A gas turbine engine, comprising:
a high pressure turbine;
a low pressure turbine aft of the high pressure turbine;
a turbine casing disposed around the high pressure turbine and the low pressure turbine; and
a heat pipe disposed in the turbine casing, the heat pipe comprising a vaporization section and a condensation section, wherein the vaporization section is radially outward from the high pressure turbine, and wherein the vaporization section is forward the condensation section relative to an engine central longitudinal axis.

11. The gas turbine engine of claim 10, wherein the heat pipe includes a working medium comprising at least one of water, ethanol, mercury, sulfur, cesium, sodium, potassium, calcium, or indium.

12. The gas turbine engine of claim 10, wherein the heat pipe includes a working medium and the working medium contacts an internal surface of the turbine casing.

13. The gas turbine engine of claim 10, wherein the heat pipe is surrounded by the turbine casing.

14. The gas turbine engine of claim 10, wherein the heat pipe is disposed within at least one of a first groove formed in an outer surface of the turbine casing or a second groove formed in an inner surface of the turbine casing.

15. The gas turbine engine of claim 10, further comprising a thermally conductive material disposed between the heat pipe and the turbine casing.

16. The gas turbine engine of claim 10, wherein the condensation section of the heat pipe is radially outward from the low pressure turbine.

17. The gas turbine engine of claim 10, wherein the heat pipe is at least one of coplanar with an outer surface of the turbine casing or recessed with respect to the outer surface of the turbine casing.

18. A method of cooling a turbine casing, comprising,
disposing a vaporization section of a heat pipe in a high pressure turbine region of the turbine casing, the high pressure turbine region of the turbine casing being configured to be located radially outward of a high pressure turbine; and
disposing a condensation section of the heat pipe aft of the vaporization section relative to an engine central longitudinal axis.

19. The method of claim 18, further including:
forming a groove in at least one of an inner surface of the turbine casing or an outer surface of the turbine casing; and
disposing the heat pipe in the groove.

20. The method of claim 18, further comprising disposing the condensation section of the heat pipe in a low pressure turbine region of the turbine casing.

* * * * *